US010281965B2

(12) United States Patent
DiBene, II et al.

(10) Patent No.: US 10,281,965 B2
(45) Date of Patent: May 7, 2019

(54) REDUCED POWER OPERATION USING STORED CAPACITOR ENERGY

(71) Applicant: Apple Inc., Cupertino, CA (US)

(72) Inventors: Joseph T. DiBene, II, Santa Cruz, CA (US); Inder M. Sodhi, Palo Alto, CA (US); Gerard R. Williams, III, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 15/430,686

(22) Filed: Feb. 13, 2017

(65) Prior Publication Data
US 2018/0232043 A1 Aug. 16, 2018

(51) Int. Cl.
G06F 1/26 (2006.01)
G06F 1/32 (2019.01)
G06F 1/3287 (2019.01)
G06F 1/3296 (2019.01)
G06F 1/324 (2019.01)

(52) U.S. Cl.
CPC .......... G06F 1/263 (2013.01); G06F 1/324 (2013.01); G06F 1/3287 (2013.01); G06F 1/3296 (2013.01)

(58) Field of Classification Search
CPC ...... G06F 1/263; G06F 1/3287; G06F 1/3296; G06F 1/324
See application file for complete search history.

(56) References Cited

U.S. PATENT DOCUMENTS

| 8,804,439 B2 | 8/2014 | Yugi et al. | |
| 2009/0224741 A1* | 9/2009 | Marholev | G05F 1/56 323/283 |
| 2009/0276642 A1 | 11/2009 | Edward et al. | |
| 2010/0011234 A1* | 1/2010 | Malik | G06F 1/26 713/323 |

FOREIGN PATENT DOCUMENTS

| JP | 2005327210 A | 11/2005 |
| WO | 2009073261 A1 | 6/2009 |

* cited by examiner

Primary Examiner — Stefan Stoynov
(74) Attorney, Agent, or Firm — Meyertons, Hood, Kivlin, Kowert & Goetzel, P.C.; Lawrence J. Merkel

(57) ABSTRACT

In an embodiment, a system may support a "coast mode" in which the power management unit (PMU) that supplies the supply voltage to an integrated circuit is disabled temporarily for certain modes of the integrated circuit. The integrated circuit may continue to operate, consuming the energy stored in capacitance in and/or around the integrated circuit. When coast mode is initiated, a time interval for coasting may be determined. When the time interval expires, the PMU may re-enable the power supply voltage.

19 Claims, 6 Drawing Sheets

REDUCED POWER OPERATION USING STORED CAPACITOR ENERGY

BACKGROUND

Technical Field

Embodiments described herein are related to power management in a system and, more particularly, to managing the power supply voltage to an integrated circuit in the system.

Description of the Related Art

Power management is a key feature in electronic systems. For example, portable electronic systems can operate from a finite energy source such as a battery. Such systems can manage power (or energy consumption) to lengthen the amount of time that the system can operate before recharging the battery. Even electronic systems that operate from a wall plug or other essentially unlimited energy source can be power managed to reduce the heat generated due to the consumption.

Typical power management features generally include clock gating (in which the clock is turned off to a digital circuit that is idle, preventing switching of logic circuitry therein when there is no work to be done) and power gating (in which the logic circuit is powered off). Clock gating reduces dynamic power consumption, but leakage currents in the circuit are still experienced. As semiconductor fabrication technologies continue to advance, fabricating transistors at smaller and smaller geometries, the leakage current continues to increase. Power gating reduces leakage current loss but also requires more time to enter and exit, and can often include a requirement to reset the circuit after powering on again.

SUMMARY

In an embodiment, a system may support a "coast mode" in which the power management unit (PMU) that supplies the supply voltage to an integrated circuit is disabled temporarily for certain modes of the integrated circuit. The integrated circuit may continue to operate, consuming the energy stored in capacitance in and/or around the integrated circuit. When coast mode is initiated, a time interval for coasting may be determined. When the time interval expires, the PMU may re-enable the power supply voltage. Energy that would be lost in the PMU to maintain the voltage (e.g. energy lost in the voltage regulator) may be saved, which may reduce overall energy consumption in the system. Additionally, in at least some modes in which coasting is supported, the integrated circuit is continuing to operate so the energy consumed during the coast interval may be put to efficient use.

BRIEF DESCRIPTION OF THE DRAWINGS

The following detailed description makes reference to the accompanying drawings, which are now briefly described.

Figure 1:
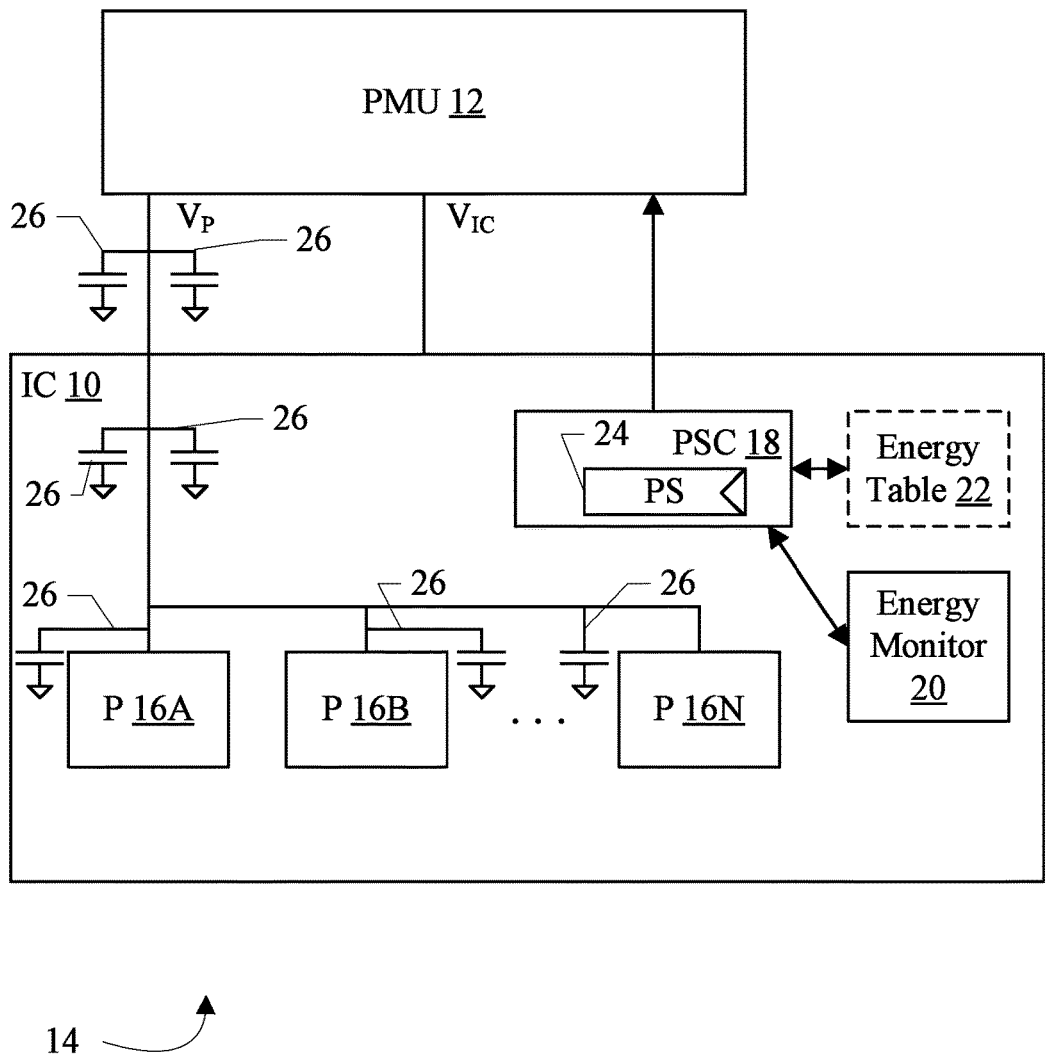
FIG. 1 is a block diagram of a portion of a system including a PMU and an integrated circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of a portion of a system 14 including an integrated circuit (IC) 10 coupled to a power management unit (PMU) 12 is shown. More particularly, the PMU 12 may be configured to supply power to the IC 10, e.g. as one or more power supply voltages such as $V_P$ and $V_{IC}$. The $V_P$ voltage may supply one or more processors (P) 16A-16N in the IC 10. The $V_{IC}$ voltage may supply a processor supply control (PSC) circuit 18, an energy monitor circuit 20, an energy table 22, and one or more other components of the IC 10. Alternatively, the PSC circuit 18, the energy monitor circuit 20, and/or the energy table 22 may be supplied by the $V_P$ voltage and other components of the IC 10 (not shown in FIG. 1) may be supplied by the $V_{IC}$ voltage. The energy table 22 and the energy monitor 20 are coupled to the PSC circuit 18, which is further coupled to the PMU 12 (e.g. through one or more pins on the IC 10). The PSC circuit 18 in the embodiment of FIG. 1 includes a power state register 24, which may store an indication of the power state(s) of the processors 16A-16N. Each processor 16A-16N may have an independent power state in an embodiment. In other embodiments, groups of processors 16A-16N may share a power state, or all processors 16A-16N may share a power state. Power states may be changed by programming the power state register 24 with an indication of the desired state. The PSC circuit 18 may be configured to manage the change to the new power state in response to a change in the power state register 24.

The system 14 may include capacitors coupled between a given power supply input to the integrated circuit and a ground input to the integrated circuit. For example, the capacitors 26 are shown in FIG. 1 on the $V_P$ supply input. Other supply inputs, such as the $V_{IC}$ input, may similarly include capacitors. The number of capacitors may vary, as may the capacitance of the capacitors. The capacitors 26 may include capacitors external to the IC 10 and/or internal to the IC 10.

The capacitors 26 may store energy captured from the PMU 12 when the PMU 12 is actively providing power on the $V_P$ input. When voltage changes (e.g. droop due to rapid changes in the load current) occur, the capacitors 26 may provide some energy to reduce the voltage change, providing some stability to the $V_P$ voltage. Thus, the amount of capacitance may be determined based on expected load currents and the characteristics of the PMU 12. In some embodiments, the amount of capacitance may also include parasitic capacitance.

The power states supported by the processors 16A-16N may include high power, high performance states and low power, lower performance states. When high performance is needed and other constraints such as thermal constraints are met, the high power, high performance states may be used. When there is less demand and/or other constraints do not permit the high power, high performance states, the lower power, lower performance states may be used.

A power state may be any combination of electrical parameters that control the performance and energy consumption/power consumption of the corresponding processor 16A-16N. For example, a power state may be a combination of supply voltage magnitude and clock frequency for the clock that operates the processor 16A-16N. Higher supply voltage magnitudes may be associated with higher power consumption (e.g. if the current consumed by the circuitry powered by the supply voltage remains the same, although it may increase as well) but also supports a higher clock frequency which may allow for higher performance. Higher clock frequencies may increase average current consumption over time, thus increasing power/energy consumption but also increasing processing throughput per unit of time.

The highest power/performance states may be characterized by high variations in energy consumption, depending on the workload and other constraints such as thermal constraints. Lower power/performance states may exhibit less variation based on the workload, other constraints may occur less frequently, and the variation between maximum energy consumption in the state and minimum energy consumption in the state may be smaller. Thus, the energy consumption of the processor in the lower power/performance states may be more predictable.

In an embodiment, a subset of the power states supported by the processors 16A-16N may be identified with reasonably predictable energy consumption. When a processor 16A-16N or the set of processors 16A-16N are operating in one of the power states in the subset, an energy conservation mode referred to here as "coasting," or "coast mode" may be used. When coasting, the PMU 12 may discontinue providing energy on the $V_P$ supply voltage input, even though the supplied processors 16A-16N may continue in operation. That is, the clock input to the processors 16A-16N may still be toggling and the processors 16A-16N may be still be executing instructions. While coasting, the processors 16A-16N may be supplied by the energy stored in the capacitors 26. When entering coast mode, the PSC circuit 18 may determine a time period (or interval) in which coasting may be performed. The time period may be based on the amount of energy stored in the capacitors 26, the amount of energy the processors 16A-16N consume in a given power state, etc. The time period may include guardbanding to ensure that the supply voltage magnitude does not decay below a level that can be supported by the processors 16A-16N. For example, the processors 16A-16N may include various state storage circuits such as registers, flops, memory arrays, etc. These state storage circuits may reliable retain their data as long as the supply voltage magnitude exceeds a certain threshold. Below the threshold, data may be lost. Thus, the time period for coasting may be based on the amount of time before the voltage decays below the threshold. The PSC circuit 18 may determine the time period, and may communicate with the PMU 12 to cause the PMU 12 to discontinue providing power on the $V_P$ voltage input.

When the time period expires, the PSC circuit 18 may communicate with the PMU 12 to cause the PMU 12 to resume providing energy on the $V_P$ voltage input. The voltage magnitude may rise as the PMU 12 re-enables, and may recover to the level assigned to the power state. Once the level is attained, in some embodiments, the PSC circuit 18 may enter coast mode again, causing the PMU 12 to discontinue energy supply.

The energy monitor circuit 20 may be configured to monitor supply voltage magnitudes and currents in the system, to provide an indication of the amount of energy stored in the capacitors 26. The energy monitor circuit 20 may be designed for a particular amount of capacitance, or may be programmable with a value identifying the capacitance.

In some embodiments, the PSC circuit 18 may determine the rate at which the processors 16A-16N consume energy based on the power state. In other embodiments, the energy table 22 may be used and may be programmed with the consumption rate for each power state in the subset for which coasting is permitted.

Each power supply input may include one or more pins that are connected to the corresponding output of the PMU 12. The number of input pins used for a given power supply input may be dependent on a maximum amount of current that may be supplied through the given power supply input, the current capabilities of a pin, and other factors. Similarly, the ground input may be one or more pins connected to a ground from which the supply voltages are referenced. The power supply input may internally be coupled to multiple conductors in a grid pattern or other power distribution network within the IC 10 (often referred to as a "rail"). Similarly, there may be a ground rail in the IC 10 coupled to the ground input.

The PMU 12 may include one or more voltage regulators configured to supply power to the IC 10 and/or other components of the system. The voltage regulators may have any design and features. For example, multiple phases of buck regulators may be implemented, where the amount of current that may be provided with good regulation of the voltage (minimal droop) is proportional to the number of phases that are on. The PMU 12 may further be configured to receive commands from the IC 10 (e.g. from the PSC circuit 18) to set supply voltage magnitudes, turn voltage regulators on/off, etc. Additionally, commands to enter and exit coast mode may be received by the PMU 12. In response to the command to enter coast mode, the PMU 12 may be configured to discontinue providing energy on the $V_P$ supply voltage input of the IC 10. For example, the PMU 12 may tristate its output on the $V_P$ supply voltage. The PMU 12 may also turn off the voltage regulator(s) assigned to the $V_P$ input, saving power. In response to the command to exit coast mode, the PMU 12 may resume supplying energy again on the $V_P$ supply voltage input. For example, the PMU 12 may initialize the voltage regulator and may enable the output on the $V_P$ supply voltage.

The IC 10 may be any integrated circuit in various embodiments. For example, the IC 10 may be a processor chip including one or more processors 16A-16N, which may be any type of processors (central processing units (CPUs), Graphics processing units (GPUs), and/or other general purpose or special purpose processors, etc.). The IC 10 may be a system on a chip (SOC) including one or more processors and one or more peripheral circuits (e.g. a memory controller coupled to a memory in a given system, bridges to input/output interfaces of various types, audio peripherals, video peripherals, etc.). In some embodiments, the IC 10 may be a fixed function IC without processors.

The processors 16A-16N may include any general purpose processors implementing any instruction set. Any microarchitectural features may be implemented (e.g. in-order, out of order, scalar, superscalar, pipelined, speculative execution, etc.). Similarly, the processors 16A-16N may be any type of graphics processor and may implement any graphics instruction set. Any microarchitectural features may be employed.

Processors 16A-16N are an example of circuits that may operate in different power states, a subset of which may be suitable for coast mode. In other embodiments, other circuits may be configured to operate in different power states and may be suitable for coast mode, including various fixed-function circuits, caches, peripheral components, etc.

Figure 2:
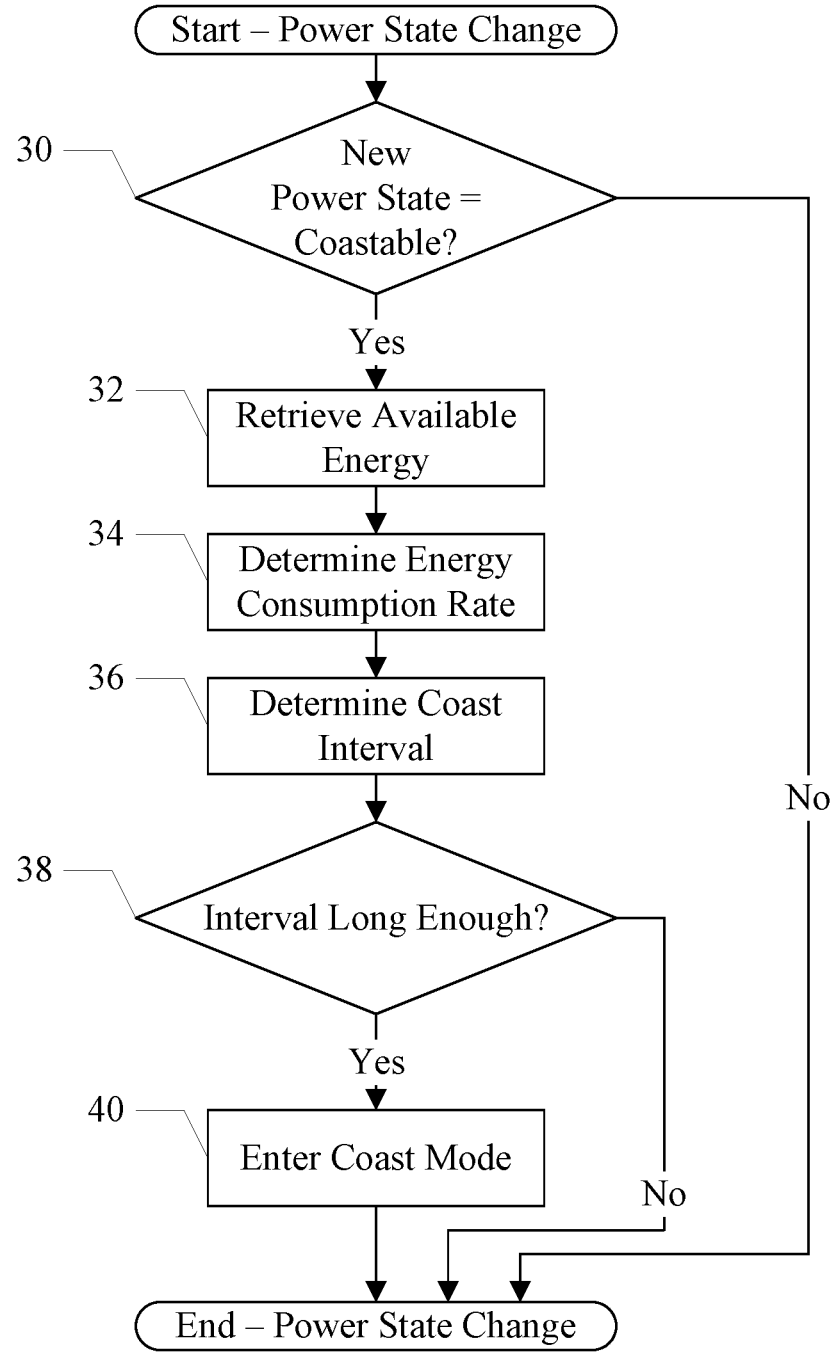
FIG. 2 is a flowchart illustrating operation of one embodiment of the components of the system shown in FIG. 1 when a power state change is performed in the system.

Turning next to FIG. 2, a flowchart illustrating operation of one embodiment of portions of the IC 10 during a power state change (e.g. in response to programming of the power state register 24 to a different power state). While the blocks are shown in a particular order for ease of understanding, other orders may be used. Blocks may be performed in parallel in combinatorial logic in the IC 10. Blocks, combinations of blocks, and/or the flowchart as a whole may be pipelined over multiple clock cycles. The IC 10 and/or portions thereof may be configured to implement the operation illustrated in FIG. 2.

Figure 4:
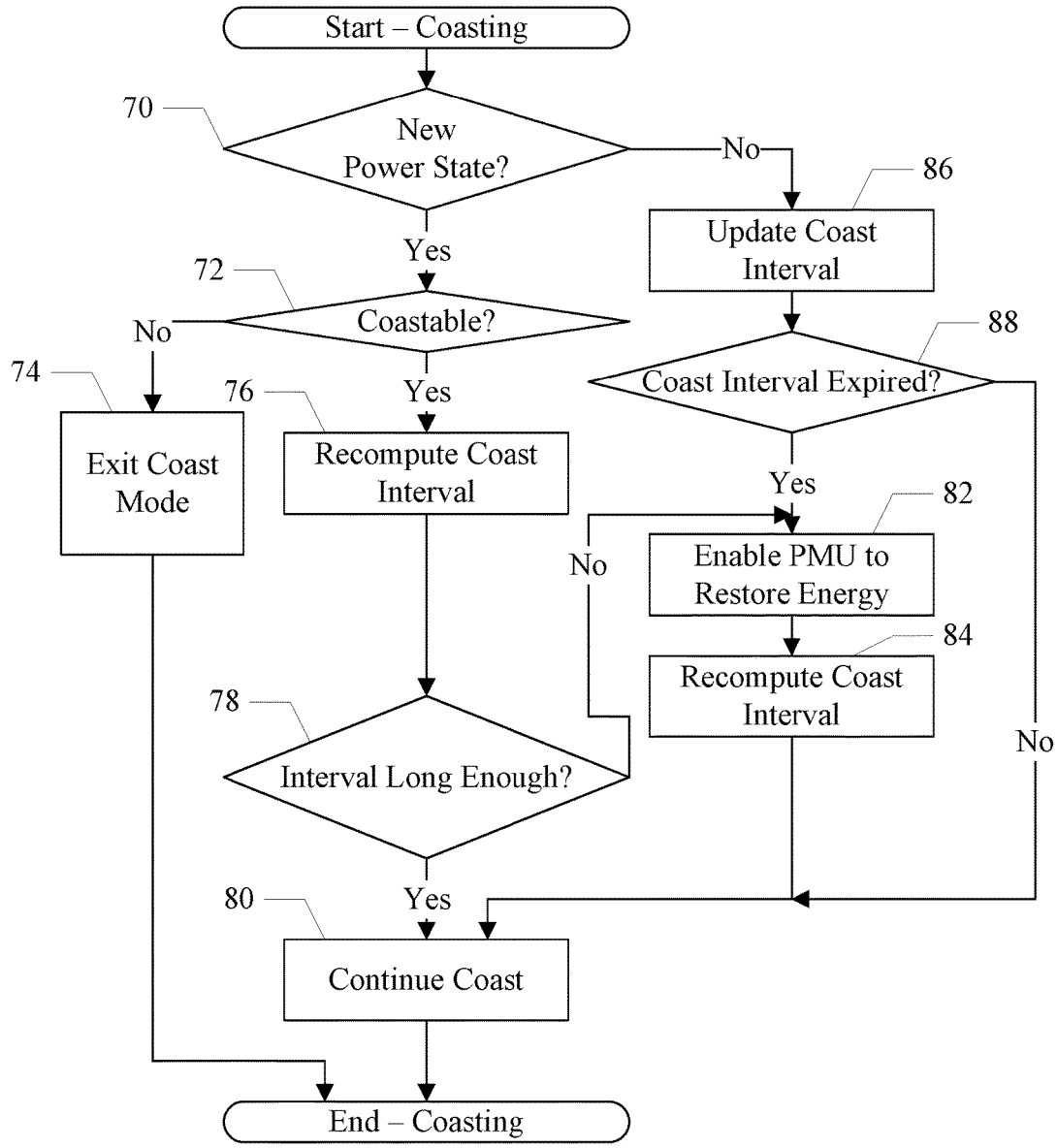
FIG. 4 is a flowchart illustrating operation of one embodiment of the components of the system shown in FIG. 1 when coasting in the coast mode.

FIG. 2 illustrates operation when a power state change is requested while coast mode has not been entered. That is, coast mode may be enabled but either the current power state does not permit coasting or the energy in the system is being replenished after a period of coasting. If a power state change is requested during coasting, operation as illustrated in FIG. 4 may apply.

The PSC circuit 18 may determine if the newly-selected power state is a power state that permits coasting (a "coastable" power state—decision block 30). If the power state is not coastable, no additional action with regard to coast mode may be performed (decision block 30, "no" leg). The PSC circuit 18 may be configured to manage the state change, e.g. communicating with the PMU 12 to establish the supply voltage magnitude for the requested state and communication with clock circuitry (not shown in FIG. 1) to establish the clock frequency for the requested state.

If the new power state is coastable (decision block 30, "yes" leg) and coast mode is enabled, the PSC circuit 18 may retrieve an indication of the available energy stored in the capacitors 26 (e.g. from the energy monitor 20, in an embodiment) (block 32). The PSC circuit 18 may also determine the energy consumption rate for the power state (e.g. from the energy table 22, in an embodiment) (block 34). Based on the available energy and the energy consumption rate, the PSC circuit 18 may be configured to determine a coast interval (block 36). The coast interval may include guardbanding, in which the interval of time determined from the energy consumption rate and the available energy is reduced to provide a margin of safety, ensuring that available energy is not depleted or reduced more than desired due to inaccuracies in the system, for example. The PSC circuit 18 may determine if the coast interval is long enough to overcome energy lost to enter coast mode (e.g. energy consumed in turning off the voltage regulator(s) in the PMU 12 and subsequently turning them on again to exit coast mode). If the interval is long enough (decision block 38, "yes" leg), the PSC circuit 18 may enter coast mode (block 40).

Figure 3:
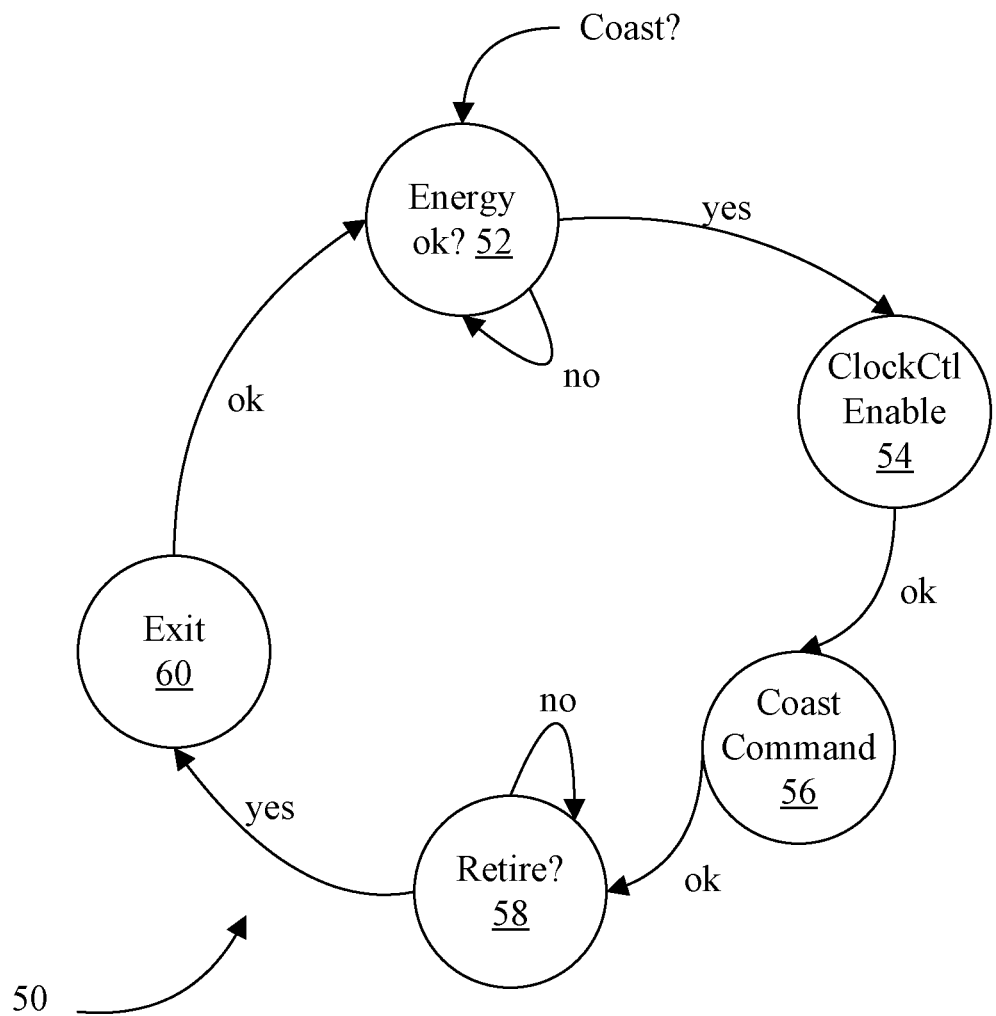
FIG. 3 is a state machine illustrating one embodiment of a progression through coast mode.

FIG. 3 is a state machine 50 illustrating one embodiment of coast mode operation. Some states of FIG. 3 may, in some embodiments, overlap with the operation of the flowcharts shown in FIGS. 2 and 4. The PSC circuit 18 may consider entering coast mode (e.g. in response to a power state change). Based on the new power and the energy available in the system (state 52), the PSC circuit 18 may determine whether or not there is enough energy available to enter coast mode. If not, the state machine 50 may remain in state 52 and the coast mode may not be entered. This operation may be represented in FIG. 2 by blocks 30-38.

Figure 7:
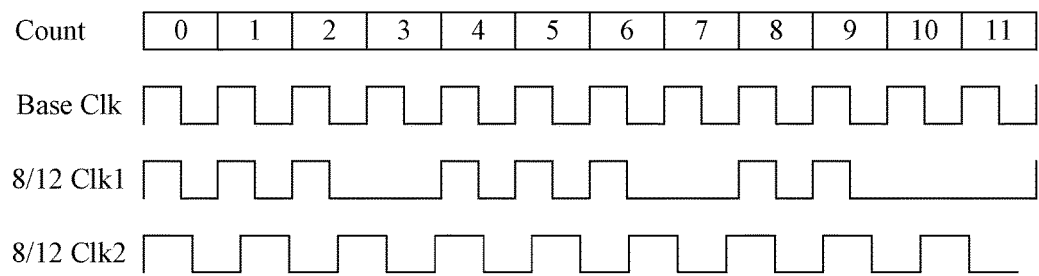
FIG. 7 is a timing diagram illustrating one embodiment of a base clock and ⅔ frequency clocks.

If there is enough available energy, the PSC circuit 18 may send a command to a clock control circuit, in one embodiment (state 54). The clock control circuit may track the power supply magnitude as it drifts down in coast mode, and may adjust the clock frequency based on the voltage drift. Various mechanisms may be used to modify the frequency, including controlling the clock generation circuitry (e.g. phase locked loops or delay lock loops), pulse swallowing, or clock stretching. FIG. 7 is an example of clock pulse swallowing (8/12 clk1) or clock stretching (8/12 clk2). The base clock (e.g. the clock as specified by the power state, when coasting is not in use) is shown, and a count of pulses is shown. The generate a clock that is 8/12 (2/3) of the frequency of the base clock, four clock pulses out of every 12 pulses can be cancelled (or swallowed), such as pulses 3, 7, 10, and 11 in FIG. 1). Pulse swallowing may be used if timing is met by the processor circuitry at the base clock frequency even with the reduced voltage. Alternatively, the pulses may be stretched so that there are 8 pulses in the same time period that there would have been 12 pulses. The clock control circuit may acknowledge, and the PSC circuit 18 may send a command to the PMU 12 to enter coast mode for a particular power supply input (state 56). The PMU 12 may tri-state the power supply input to the IC 10 (disabling the supply) and may also tri-state the output bridges with the PMU 12, temporarily shutting down. The voltage may be monitored by the PSC circuit 18 at the load as the frequency slowly scales (by the clock control circuit) with the voltage to maintain timing margins. The states 54 and 56 may be represented by the enter coast mode block 40 in FIG. 2, in an embodiment.

At some point (e.g. after the coast interval has expired, or in response to an attempt to increase the power state of a processor 16A-16N), the state machine 50 may retire the coast mode (state 58). The PSC circuit 18 may signal the PMU 12 to start back up in PFM mode to maintain the retention voltage for the load (state 60). The PSC circuit 18 may disable coast mode and the PMU 12 may await a command to adjust the voltage for the next on-coming power state to run the next workload. In an embodiment, the operation of states 58 and 60 may be represented by a portion of the flowchart shown in FIG. 4.

FIG. 4 is a flowchart illustrating one embodiment of operation of portions of the IC 10 while coasting (i.e. operating with the PMU 12 disabled for the $V_P$ voltage). While the blocks are shown in a particular order for ease of understanding, other orders may be used. Blocks may be performed in parallel in combinatorial logic in the IC 10. Blocks, combinations of blocks, and/or the flowchart as a whole may be pipelined over multiple clock cycles. The IC 10 and/or portions thereof may be configured to implement the operation illustrated in FIG. 4.

While the processors 16A-16N are coasting, a change in the power state may be requested by programming a different value in the power state register 24. If a new power state is requested (decision block 70, "yes" leg), the new power state may or may not be coastable (decision block 72). In an embodiment, the new power state may be coastable if it is in the subset of power states that are enabled for coasting. In another embodiment, the new power state may be coastable in this context if it is a lower power state than the current power state (e.g. because the supply voltage magnitude may not be high enough to support the clock frequency in the new power state if the new power state is higher power than the current power state).

If the new power state is not coastable (decision block 72, "no" leg), the PSC circuit 18 may exit coast mode (block 74). Exiting coast mode may include, e.g., re-enabling the PMU 12 for the $V_P$ supply voltage. If the new power state is coastable (decision block 72, "yes" leg), the PSC circuit 18 may be configured to recompute the coast interval (block 76). The recomputed coast interval may be based on the remaining coast interval at the current power state, the rate of energy consumption at the current power state, and the rate of energy consumption at the new power state. If the rate of energy consumption is higher at the new power state than at the current power state, the computed coast interval may be less than the remaining coast interval. If the rate of energy consumption is lower at the new power state than at the current power state, the computed coast interval may be greater than the remaining coast interval. If the recomputed coast interval is long enough to make coasting worthwhile (decision block 78, "yes" leg), coasting may continue based on the recomputed interval (block 80). The threshold for determining "long enough" in this case may be lower than that illustrated in FIG. 2, because the PMU 12 is already disabled on the $V_P$ voltage. If the recomputed coast interval is not long enough (decision block 78, "no" leg), the PSC circuit 18 may enable the PMU 12 to restore energy on the $V_P$ voltage input (block 82). Once energy is restored, coast mode may be re-entered with a newly recalculated coast interval (block 84) and coasting may continue (block 80). In other embodiments, a change in power state may cause an exit from coast mode even if the requested power state is coastable.

If no power state change is requested (decision block 70, "no" leg), the PSC circuit 18 may update the coast interval to account for the passage of time (block 86). If the updated coast interval has not expired (decision block 88, "no" leg), coasting may continue (block 80). If the updated coast interval has expired (decision block 88, "yes" leg), the PSC circuit 18 may re-enable the PMU 12 to restore the energy to the $V_P$ power input (block 82), and may recompute the coast interval to continue coasting (blocks 84 and 80).

Figure 5:
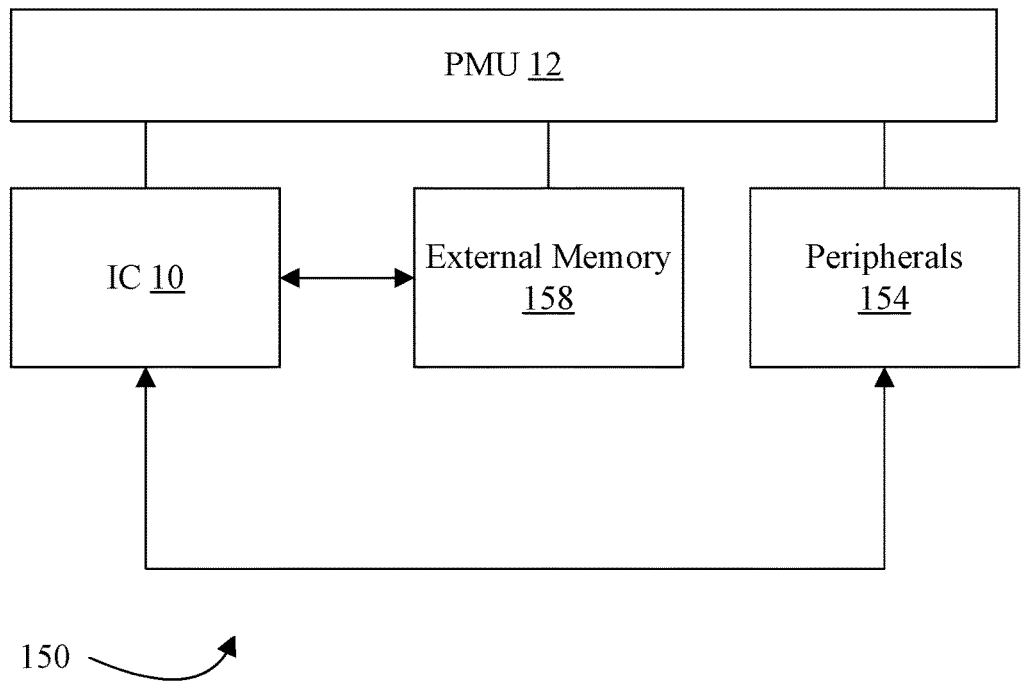
FIG. 5 is a block diagram of one embodiment of a system including the components shown in FIG. 1

FIG. 5 is a block diagram of one embodiment of a system 150. In the illustrated embodiment, the system 150 includes at least one instance of an integrated circuit (IC) 10 coupled to one or more peripherals 154 and an external memory 158. The PMU 12 is provided which supplies the supply voltages to the IC 10 as well as one or more supply voltages to the memory 158 and/or the peripherals 154.

The peripherals 154 may include any desired circuitry, depending on the type of system 150. For example, in one embodiment, the system 150 may be a computing device (e.g., personal computer, laptop computer, etc.), a mobile device (e.g., personal digital assistant (PDA), smart phone, tablet, etc.). In various embodiments of the system 150, the peripherals 154 may include devices for various types of wireless communication, such as wife, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The DRAMs 12A-12B may be any type of such DRAM as listed above. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 10 in a chip-on-chip or package-on-package implementation.

Figure 6:
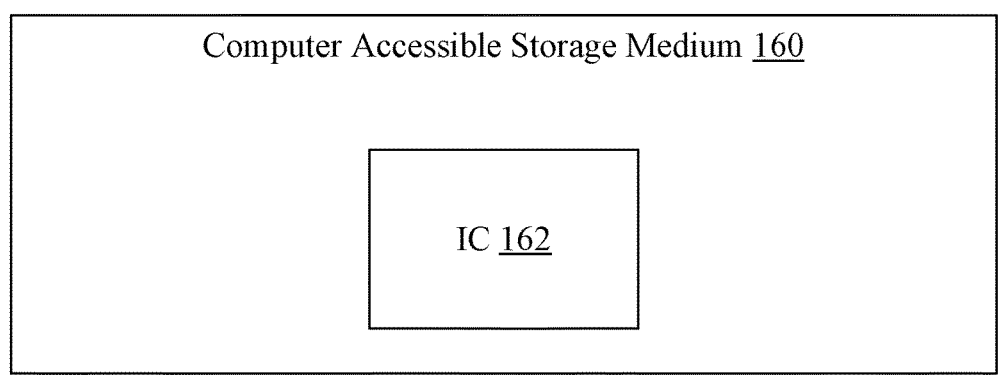
FIG. 6 is a block diagram of one embodiment of a computer accessible storage medium.

FIG. 6 is a block diagram of one embodiment of a computer accessible storage medium 160 storing an electronic description of the IC 10 (reference numeral 162) is shown. The description may further include other components such as the portions of the CPMS that may be outside the IC 10 in some embodiments. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 stored on the computer accessible storage medium 160 may be a database which can be read by a program and used, directly or indirectly, to fabricate the hardware comprising the IC 10 and/or other components of the system. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 10. The netlist may then be placed and routed to produce a data set describing geometric shapes to be applied to masks. The masks may then be used in various semiconductor fabrication steps to produce a semiconductor circuit or circuits corresponding to the IC 10. Alternatively, the description 162 on the computer accessible storage medium 300 may be the netlist (with or without the synthesis library) or the data set, as desired.

While the computer accessible storage medium 160 stores a description 162 of the IC 10, other embodiments may store a description 162 of any portion of the IC 10 and/or any portion of the system.

Numerous variations and modifications will become apparent to those skilled in the art once the above disclosure is fully appreciated. It is intended that the following claims be interpreted to embrace all such variations and modifications.

What is claimed is:

1. A system comprising:
   an integrated circuit comprising at least a first circuit that is operable in a plurality of power states and a power control circuit coupled to the first circuit;
   a power management unit coupled to the integrated circuit and configured to supply energy to the integrated circuit, including the first circuit;
   wherein the power control circuit is configured to:
   detect that the first circuit is in a first power state in which energy consumption in the first circuit is less than a first threshold;
   detect that energy stored in capacitors coupled between a power management unit input for the first circuit and a ground input of the integrated circuit is sufficient to supply the first circuit with energy for at least a first time period in the first power state; and
   cause the power management unit to discontinue supplying energy to the first circuit in response to detecting the first power state and the sufficient energy;
   wherein the first circuit continues operation on the stored energy during the first time period;
   wherein the power control circuit is configured to detect a power state change to a second power state during the first time period, wherein power consumption is less than the first threshold in the second power state, and the power control circuit is configured to determine a second time period responsive to remaining energy stored in the capacitors.

2. The system as recited in claim 1 wherein the power control circuit is configured to detect an expiration of the first time period and cause the power management unit to resume supplying energy to the first circuit in response to the expiration.

3. The system as recited in claim 2 wherein the power control circuit is configured to cause the power management unit to again discontinue supplying energy responsive to the stored energy reaching the sufficient amount again subsequent to the expiration and responsive to the first circuit remaining in the first power state.

4. The system as recited in claim 1 wherein, if the second time period is greater than a second threshold, the power control circuit is configured to continue with the power supply discontinued.

5. The system as recited in claim 1 wherein, if the second time period is less than a second threshold, the power control circuit is configured to cause the power management unit to resume supplying energy to the first circuit.

6. The system as recited in claim 1 wherein the power control circuit is configured to detect a power state change to a second power state during the first time period, wherein power consumption is greater than the first threshold in the second power state, and the power control circuit is configured to cause the power management unit to resume supplying energy to the first circuit responsive to the power state change.

7. The system as recited in claim 1 wherein the first circuit is a processor.

8. The system as recited in claim 1 wherein the first circuit is one of a plurality of circuits having power states controlled by the power control circuit, and wherein discontinuing supply of energy by the power management unit is responsive to power states of the plurality of circuits.

9. An integrated circuit comprising:
at least one processor operable in a plurality of power states; and
a power control circuit coupled to the processor, wherein the power control circuit is configured to:
detect that a first power state of the processor is one of a subset of the plurality of power states, the subset excluding at least one of the plurality of power states;
determine a first time period in which energy stored in capacitors coupled between a power supply input for the processor and a ground input of the integrated circuit is capable of supplying the processor in the first power state; and
cause the power management unit to discontinue supplying energy to the processor in response to detecting the first power state and the first time period;
and the processor continues executing instructions on the stored energy during the first time period.

10. The integrated circuit as recited in claim 9 wherein the power control circuit is configured to detect an expiration of the first time period and cause the power management unit to resume supplying energy to the processor in response to the expiration.

11. The integrated circuit as recited in claim 10 wherein the power control circuit is configured to cause the power management unit to again discontinue supplying energy responsive to the stored energy in the capacitors being capable of supplying the processor for the first time period subsequent to the expiration and responsive to the processor remaining in the first power state.

12. The integrated circuit as recited in claim 9 wherein the power control circuit is configured to detect a power state change to a second power state during the first time period, wherein the second power state is in the subset of the plurality of power states, and the power control circuit is configured to determine a second time period responsive to remaining energy stored in the capacitors.

13. The integrated circuit as recited in claim 12 wherein, if the second time period is greater than a first threshold, the power control circuit is configured to continue with the power supply discontinued for up to the second time period.

14. The integrated circuit as recited in claim 12 wherein, if the second time period is less than a first threshold, the power control circuit is configured to cause the power management unit to resume supplying energy to the processor.

15. The integrated circuit as recited in claim 9 wherein the power control circuit is configured to detect a power state change to a second power state during the first time period, wherein the second power state is excluded from the subset of the plurality of power states, and the power control circuit is configured to cause the power management unit to resume supplying energy to the processor responsive to the power state change.

16. A method comprising:
detecting that a first power state of a processor in an integrated circuit is one of a subset of a plurality of power states, the subset excluding at least one of the plurality of power states, wherein the processor supports each of the plurality of power states;
determining a first time period in which energy stored in capacitors coupled between a power supply input for the processor and a ground input of the integrated circuit is capable of supplying the processor in the first power state;
causing the power management unit to discontinue supplying energy to the processor in response to detecting the first power state and the first time period; and
continuing instruction execution in the processor on the stored energy during the first time period.

17. The method as recited in claim 16 further comprising:
detecting an expiration of the first time period; and
causing the power management unit to resume supplying energy to the processor in response to the expiration.

18. The method as recited in claim 16 further comprising:
detecting a power state change to a second power state during the first time period, wherein the second power state is in the subset of the plurality of power state; and
determining a second time period responsive to remaining energy stored in the capacitors and the second power state.

19. The integrated circuit as recited in claim 16 further comprising:
detecting a power state change to a second power state during the first time period, wherein the second power state is excluded from the subset of the plurality of power states; and
causing the power management unit to resume supplying energy to the processor responsive to the power state change.

* * * * *